United States Patent
Dobson

(10) Patent No.: US 7,840,302 B2
(45) Date of Patent: Nov. 23, 2010

(54) METHODS OF ANALYZING INTEGRATED CIRCUIT EQUIVALENCY AND MANUFACTURING AN INTEGRATED CIRCUIT

(75) Inventor: Joel L. Dobson, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 453 days.

(21) Appl. No.: 11/424,249

(22) Filed: Jun. 15, 2006

(65) Prior Publication Data
US 2008/0005066 A1      Jan. 3, 2008

(51) Int. Cl.
G06F 19/00 (2006.01)
(52) U.S. Cl. ............................ 700/121; 702/197
(58) Field of Classification Search ............... 700/121, 700/108–109; 702/197, 181, 81; 707/3
See application file for complete search history.

(56) References Cited
U.S. PATENT DOCUMENTS

| | | | | |
|---|---|---|---|---|
| 6,789,031 B2 * | 9/2004 | Wang | ............................ | 702/81 |
| 6,922,600 B1 * | 7/2005 | Conrad et al. | ............... | 700/108 |
| 6,964,001 B2 * | 11/2005 | Dervisoglu et al. | ......... | 714/726 |
| 7,136,776 B2 * | 11/2006 | Eichblatt et al. | ............ | 702/181 |
| 2003/0125903 A1 * | 7/2003 | Dobson | ...................... | 702/181 |
| 2005/0106803 A1 * | 5/2005 | Yamada et al. | .............. | 438/200 |

* cited by examiner

*Primary Examiner*—Kidest Bahta
(74) *Attorney, Agent, or Firm*—Warren L. Franz; Wade J. Brady, III; Frederick J. Telecky, Jr.

(57) ABSTRACT

Methods of analyzing equivalency with respect to split and limited release lots of wafers of integrated circuits. One embodiment of the split-lot method includes: (1) dividing a set of data regarding the split lot into control and experimental subsets, (2) summarizing statistics regarding the set and the subsets to an experimental unit above a site level and (3) performing a two-way analysis of variance with respect to the statistics to determine the equivalency, using the set for one way of the analysis of variance and the subsets for another way of the analysis of variance. One embodiment of the limited-release method includes: (1) designating a set of data regarding a lot fabricated by a normative integrated circuit fabrication process as a control set, (2) designating a set of data regarding the limited release lot as an experimental set, (3) summarizing statistics regarding the control and experimental sets to an experimental unit above a site level and (4) performing a Kruskal-Wallace test with respect to the statistics to determine the equivalency.

20 Claims, 4 Drawing Sheets

METHODS OF ANALYZING INTEGRATED CIRCUIT EQUIVALENCY AND MANUFACTURING AN INTEGRATED CIRCUIT

TECHNICAL FIELD OF THE INVENTION

The invention is directed, in general, to integrated circuit (IC) fabrication and, more particularly, to a system and method for analyzing IC equivalency.

BACKGROUND OF THE INVENTION

Numerous complex and sensitive chemical and mechanical processes requiring complicated, delicate and specialized equipment are necessary to fabricate a modern IC. A modern IC fabrication facility therefore must be carefully maintained and monitored to ensure that the ICs it produces operate as intended. Monitoring and maintaining an IC fabrication facility under normal circumstances are sufficiently challenging. However, they becomes especially challenging when changes are introduced into the facility.

Changes come in many different types and degrees. For example, a change may result when a new supplier is chosen to supply a gas used to fabricate ICs, when a process temperature, pressure or time is modified, when equipment is repaired, modified, replaced or added or when process steps are added or omitted. A customer may explicitly request that a change be made.

A responsible manufacturer evaluates changes to determine their effect on ICs being fabricated before incorporating those changes into regular production. The issue is one of "equivalency" or "sameness;" is an IC fabricated after a change the "same" as an IC fabricated before the change? If so, the change is deemed acceptable for regular production.

Equivalency is analyzed with respect to one or more measurable and quantifiable characteristics, e.g., voltage, current, speed or dimension. The one or more characteristics are measured with respect to a set of ICs fabricated by the process before the change (often called the "control" or "base" set) and a set of ICs fabricated by the process after the change (often called the "experimental" or "test" set). For purposes of the present discussion, the fabrication process without the change will be called the "normative" fabrication process, and the fabrication process that includes the change will be called the "candidate" fabrication process.

Base and test sets may be designated in different ways. For example, a single lot of ICs may be divided (typically evenly) into base and test sets; this is called a "split lot." Alternatively, a single lot may be designated as the test set. Although split lots are generally preferred, the latter may be preferred when the change in question is customer-driven and the lot is therefore customer-specific (a so-called "limited release" lot). One or more split or limited release lots may be used to analyze equivalency with respect to a given candidate process.

Irrespective of whether split lots or limited release lots are used, one conventional process of analyzing equivalency is as follows. First, the lots are processed and one or more of their characteristics measured. Then, the characteristics of the test set (which form a scattered distribution) are compared to the characteristics of the base set (which also form a scattered distribution). Extreme values, or "outliers," in each set are often disregarded. Equivalency is defined as the extent to which those sets of characteristics overlap. An overlap of 98% may, depending upon application-specific circumstances, be regarded as sufficient for equivalency to exist.

For example, if a lot of 100 wafers having 10 ICs per wafer is split into a 50-wafer base set and a 50-wafer test set, the characteristic(s) of 500 test ICs (50 wafers multiplied by 10 ICs per wafer) are compared to the characteristic(s) of 500 base ICs. If the two sets of characteristic(s) overlap (disregarding outliers) by at least a threshold extent (e.g., 99%), equivalency is regarded to exist.

U.S. Pat. No. 6,789,031, which issued to Wang on Sep. 7, 2004, entitled "Method for Determining the Equivalency Index of Products, Processes, and Services," commonly assigned herewith and incorporated herein by reference, describes a process of analyzing equivalency.

The accuracy with which equivalency is determined can have a profound impact on the cost of ICs and the reputation of their manufacturer. Two types of errors are possible. False positives (sometimes colloquially called "false reds") occur when a particular IC fails the equivalency test, but actually works properly. False positives are incorrectly regarded as waste and discarded; the cost of their fabrication must be recovered by other means. False negatives (sometimes colloquially called "false greens") occur when a particular IC passes the equivalency test, but actually is defective. False negatives are shipped to customers as though they were good. The customers are then left to discover that one or more of the ICs for which they have paid are defective, which is a source of potential embarrassment to the manufacturer.

While reasonably adept at determining equivalency, the above-described conventional process sometimes still produces false positives and false negatives. Accordingly, what is needed in the art is a better way to determine equivalency.

SUMMARY OF THE INVENTION

To address the above-discussed deficiencies of the prior art, the invention provides, in one aspect, a method of analyzing equivalency with respect to a split lot of wafers of ICs. In one embodiment, the method includes: (1) dividing a set of data regarding the split lot into control and experimental subsets, (2) summarizing statistics regarding the set and the subsets to an experimental unit above a site level and (3) performing a two-way analysis of variance (ANOVA) with respect to the statistics to determine the equivalency, using the set for one way of the ANOVA and the subsets for another way of the ANOVA.

In another aspect, the invention provides a method of manufacturing an IC. In one embodiment, the method includes: (1) analyzing equivalency with respect to a split lot of wafers of ICs by: (1a) dividing a set of data regarding the split lot into control and experimental subsets, (1b) summarizing statistics regarding the set and the subsets to an experimental unit above a site level and (1c) performing a two-way ANOVA with respect to the statistics to determine the equivalency, using the set for one way of the ANOVA and the subsets for another way of the ANOVA and (2) evaluating a candidate IC fabrication process based on an existence of the equivalency.

In yet another aspect, the invention provides a method of analyzing equivalency with respect to a limited release lot of wafers of ICs. In one embodiment, the method includes: (1) designating a set of data regarding a lot fabricated by a normative IC fabrication process as a control set, (2) designating a set of data regarding the limited release lot as an experimental set, (3) summarizing statistics regarding the control and experimental sets to an experimental unit above a site level and (4) performing a Kruskal-Wallace Test with respect to the statistics to determine the equivalency.

In still another aspect, the invention provides a method of manufacturing an IC. In one embodiment, the method includes: (1) analyzing equivalency with respect to a limited release lot of wafers of ICs by: (1a) designating a set of data regarding a lot fabricated by a normative IC fabrication process as a control set, (1b) designating a set of data regarding the limited release lot as an experimental set, (1c) summarizing statistics regarding the control and experimental sets to an experimental unit above a site level and (1d) performing a Kruskal-Wallace Test with respect to the statistics to determine the equivalency and (2) evaluating a candidate IC fabrication process based on an existence of the equivalency.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Various embodiments of methods carried out according to the principles of the invention will first be described. Then sample data will be presented to demonstrate analysis of equivalency.

Conventional methods of determining equivalency evaluate data at the site level; data from different sites on different wafers are commingled to form a base distribution and a test distribution. The overlap of those two distributions is used to determine equivalency. Tacitly underlying these conventional methods is the assumption that site-level data is independent and identically distributed or "i.i.d."

The invention recognizes this assumption to be fundamentally incorrect. Commingling of data by conventional methods obscures effects due to variations among wafers or lots. Means and standard deviations among wafers or lots represent separate moments that require separate analysis. The methods set forth below respect these separate moments by summarizing statistics at experimental units above the site level (e.g., the wafer level or the lot level) and therefore more accurately reflect equivalency. Tests of statistical hypotheses (e.g., p-value, which indicates error rate) are used to determine equivalency instead of overlap. Subtracting the p-value from one and expressing the result in terms of a percentage yields statistical significance.

Figure 1A:
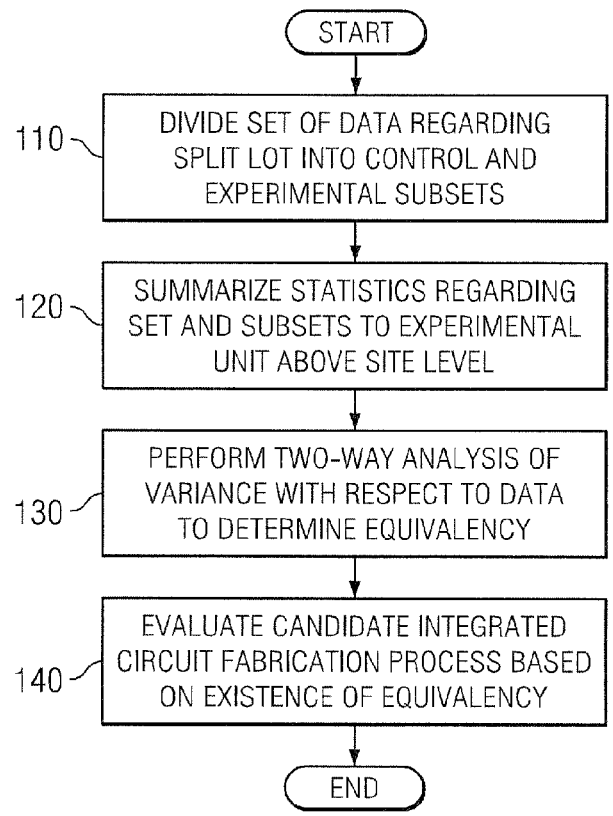
FIG. 1A illustrates a flow diagram of one embodiment of a method of manufacturing an integrated circuit carried out according to the principles of the invention.

FIG. 1A illustrates a flow diagram of one embodiment of a method of manufacturing an IC carried out according to the principles of the invention. The method of FIG. 1A is applicable with respect to split lots of wafers of ICs. The method begins in a start step.

The method of manufacturing incorporates a method of analyzing equivalency with respect to the split lot. The illustrated embodiment of the method of analyzing equivalency includes three steps. In a step 110, a set of data regarding the split lot is divided into control (or base) and experimental (or test) subsets. More specifically, data regarding that portion of the split lot that was fabricated using a "normative" IC fabrication process (the fabrication process that lacks the change in question) is placed in the control subset, and data regarding that portion of the split lot that was fabricated using a "candidate" IC fabrication process (the fabrication process that include the change in question) is placed in the experimental subset.

For purposes of the invention, the change that differentiates the candidate IC fabrication process from the normative IC fabrication process may be, e.g., a new supplier of a gas used to fabricate the ICs, a modified process temperature, a modified process pressure, a modified process time, an equipment repair, an equipment modification, an equipment replacement, an equipment addition, an additional process step, an omitted process step or any other cognizable change.

In a step 120, statistics regarding the set and the subsets are summarized to an experimental unit above a site level. In the illustrated embodiment, the experimental unit is a wafer level. Alternatively, the experimental level may be a split level, lot level or any other appropriate level. In a more specific embodiment, the mean of the wafers and the standard deviations within each of the wafers are determined.

At this point, this embodiment of the method of analyzing equivalency is complete. In a step 130, a two-way ANOVA is performed with respect to the statistics to determine the equivalency. Those skilled in the pertinent art understand the theory and practice of two-way ANOVA. However, for a brief introduction to ANOVA, see, e.g., http://www.georgetown.edu/departments/psychology/researchmethods/statistics/inferential/anova.htm, which is incorporated herein by reference. In the illustrated embodiment, the set (including both subsets) is used for one way (the first "X-variable") of the ANOVA (thereby respecting the lot effect), and the subsets are used separately for another way (the second "X-variable") of the ANOVA (thereby respecting treatment or split effects).

In a step 140, the candidate IC fabrication process is evaluated based on an existence of the equivalency. The level of correspondence sufficient to establish equivalency is determined. If the level of correspondence resulting from the ANOVA is at or above that level, equivalency exists, and the candidate IC fabrication process should be regarded as acceptable. If, on the other hand, the level of correspondence resulting from the ANOVA is below that level, equivalency does not exist, and the candidate IC fabrication process should be regarded as unacceptable. Specifically, if the partial p-value associated with the split variable is larger than a chosen threshold, usually 0.05, equivalency exists, and the color is green.

Figure 1B:
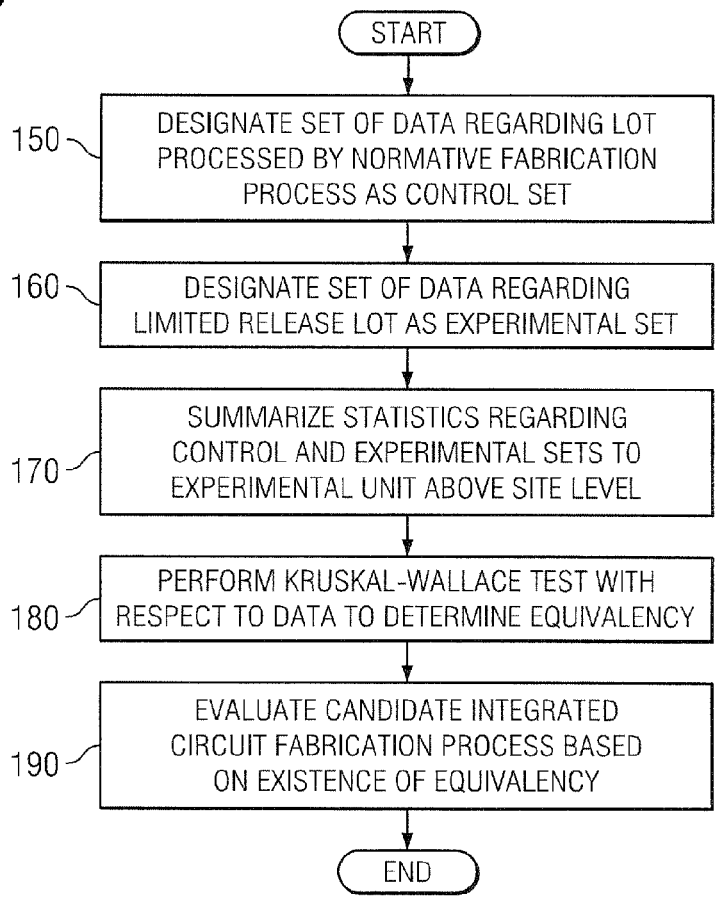
FIG. 1B illustrates a flow diagram of another embodiment of a method of manufacturing an integrated circuit carried out according to the principles of the invention.

FIG. 1B illustrates a flow diagram of another embodiment of a method of manufacturing an IC carried out according to the principles of the invention. The method of FIG. 1B is applicable with respect to limited release lots of wafers of ICs. The method begins in a start step.

The method of manufacturing incorporates a method of analyzing equivalency with respect to the limited release lot. The illustrated embodiment of the method of analyzing equivalency includes four steps. In a step 150, a set of data regarding a lot fabricated by a normative IC fabrication process is designated as a control set. In a step 160, a set of data regarding the limited release lot is designated as an experimental set. In a step 170, statistics regarding the control and experimental sets are summarized to an experimental unit above a site level. In the illustrated embodiment, the experimental unit is a lot level. Alternatively, the experimental level may be any other appropriate level. In a specific embodiment, the lot mean of the limited release lot, the lot standard deviation among the wafer means and the lot mean of within-wafer standard deviations are determined.

In a step 180, a Kruskal-Wallace test is performed with respect to the statistics to determine the equivalency. At this point, this embodiment of the method of analyzing equivalency is complete.

Those skilled in the pertinent art understand the theory and practice of the Kruskal-Wallace test. The Kruskal-Wallis test is a nonparametric method of testing the hypothesis that several populations have the same continuous distribution versus a null hypothesis that measurements tend to be higher in one or more of the populations.

To apply the Kruskal-Wallace test, N observations of sizes $n_1, n_2, \ldots, n_m$ are obtained from m populations and ranked. If $R_i$ represents the sum of the ranks of the $n_i$ observations in the $i^{th}$ sample, the Kruskal-Wallace statistic is:

$$H = [12/(N(N+1))]*Sum[R_i^2/n_i, i, 1, m] - 3(N+1)$$

When the sample sizes are large and all m populations have the same continuous distribution, H has an approximate chi-square distribution with m−1 degrees of freedom. When H is large, a small right-tail probability (p-value) is created, and the null hypothesis that all populations have the same distribution is properly rejected.

In a step 190, the candidate IC fabrication process is evaluated based on an existence of the equivalency. The level of correspondence sufficient to establish equivalency is determined. If the level of correspondence resulting from the Kruskal-Wallace test is at or above that level, equivalency exists, and the candidate IC fabrication process should be regarded as acceptable. If, on the other hand, the level of correspondence resulting from the Kruskal-Wallace test is below that level, equivalency does not exist, and the candidate IC fabrication process should be regarded as unacceptable.

Having described various embodiments of methods carried out according to the principles of the invention, sample data will now be presented to demonstrate analysis of equivalency in the context of a split lot. Tables 2-13 and FIGS. 2-5, which are presented to illustrate the analysis, are the product of a commercially available software application program called JMP®. JMP® is a statistical analysis GUI offered by SAS Institute, Incorporated of Cary, N.C., and provides extended statistical analysis with useful graphics. Although useful for purposes of illustration, an understanding of JMP® is not necessary to an understanding of the invention.

The sample data set has 105 readings. The sample data set pertains to three lots with 21 total wafers. Each wafer has five site readings. Table 1, below, gives the sample data set. "Count" is the reading number. "Lot" is the lot number. "Split" indicates whether the reading pertains to the base (control) subset or the test (experimental) subset. "Voltage" is the reading itself. "Site" is the site on a given wafer at which the reading was taken.

TABLE 1
Sample Data Set

| Count | Lot | Split | Wafer | Voltage | Site |
|---|---|---|---|---|---|
| 1 | C-1 | Base | C-1-1 | 1.6231050 | 1 |
| 2 | C-1 | Base | C-1-1 | 1.8331496 | 2 |
| 3 | C-1 | Base | C-1-1 | 1.8298689 | 3 |
| 4 | C-1 | Base | C-1-1 | 1.9503816 | 4 |
| 5 | C-1 | Base | C-1-1 | 2.0328180 | 5 |
| 6 | C-1 | Base | C-1-2 | 1.8597870 | 1 |
| 7 | C-1 | Base | C-1-2 | 1.6284644 | 2 |
| 8 | C-1 | Base | C-1-2 | 2.1803381 | 3 |
| 9 | C-1 | Base | C-1-2 | 2.2280563 | 4 |
| 10 | C-1 | Base | C-1-2 | 2.3335923 | 5 |
| 11 | C-1 | Base | C-1-3 | 2.9902990 | 1 |
| 12 | C-1 | Base | C-1-3 | 2.6003412 | 2 |
| 13 | C-1 | Base | C-1-3 | 3.4352062 | 3 |
| 14 | C-1 | Base | C-1-3 | 3.3360332 | 4 |
| 15 | C-1 | Base | C-1-3 | 3.4312128 | 5 |
| 16 | C-1 | Base | C-1-4 | 2.4519611 | 1 |
| 17 | C-1 | Base | C-1-4 | 3.3150859 | 2 |
| 18 | C-1 | Base | C-1-4 | 2.8421156 | 3 |
| 19 | C-1 | Base | C-1-4 | 3.3162528 | 4 |
| 20 | C-1 | Base | C-1-4 | 3.2004961 | 5 |
| 21 | C-1 | Test | C-1-5 | 3.9647658 | 1 |
| 22 | C-1 | Test | C-1-5 | 3.3885389 | 2 |
| 23 | C-1 | Test | C-1-5 | 4.5879607 | 3 |
| 24 | C-1 | Test | C-1-5 | 4.2414182 | 4 |
| 25 | C-1 | Test | C-1-5 | 4.2963510 | 5 |
| 26 | C-1 | Test | C-1-6 | 5.0853701 | 1 |
| 27 | C-1 | Test | C-1-6 | 5.5884752 | 2 |
| 28 | C-1 | Test | C-1-6 | 4.9823509 | 3 |
| 29 | C-1 | Test | C-1-6 | 4.3800255 | 4 |
| 30 | C-1 | Test | C-1-6 | 5.1123236 | 5 |
| 31 | C-1 | Test | C-1-7 | 4.2288612 | 1 |
| 32 | C-1 | Test | C-1-7 | 3.8172800 | 2 |
| 33 | C-1 | Test | C-1-7 | 3.2880194 | 3 |
| 34 | C-1 | Test | C-1-7 | 3.3109348 | 4 |
| 35 | C-1 | Test | C-1-7 | 3.7118370 | 5 |
| 36 | C-2 | Base | C-2-10 | 6.4105584 | 1 |
| 37 | C-2 | Base | C-2-10 | 6.5000568 | 2 |
| 38 | C-2 | Base | C-2-10 | 6.6827154 | 3 |
| 39 | C-2 | Base | C-2-10 | 7.1462752 | 4 |
| 40 | C-2 | Base | C-2-10 | 7.0430796 | 5 |
| 41 | C-2 | Base | C-2-11 | 6.0661815 | 1 |
| 42 | C-2 | Base | C-2-11 | 6.4638935 | 2 |
| 43 | C-2 | Base | C-2-11 | 5.8743874 | 3 |
| 44 | C-2 | Base | C-2-11 | 5.8656088 | 4 |
| 45 | C-2 | Base | C-2-11 | 6.1117321 | 5 |
| 46 | C-2 | Test | C-2-12 | 7.1401464 | 1 |
| 47 | C-2 | Test | C-2-12 | 6.9772203 | 2 |
| 48 | C-2 | Test | C-2-12 | 7.0997243 | 3 |
| 49 | C-2 | Test | C-2-12 | 7.5187656 | 4 |
| 50 | C-2 | Test | C-2-12 | 7.1704651 | 5 |
| 51 | C-2 | Test | C-2-13 | 7.4333611 | 1 |
| 52 | C-2 | Test | C-2-13 | 8.2652164 | 2 |
| 53 | C-2 | Test | C-2-13 | 7.6207989 | 3 |
| 54 | C-2 | Test | C-2-13 | 8.0312165 | 4 |
| 55 | C-2 | Test | C-2-13 | 8.0588515 | 5 |
| 56 | C-2 | Test | C-2-14 | 8.2989330 | 1 |
| 57 | C-2 | Test | C-2-14 | 7.9754192 | 2 |
| 58 | C-2 | Test | C-2-14 | 7.9183422 | 3 |
| 59 | C-2 | Test | C-2-14 | 8.0019811 | 4 |
| 60 | C-2 | Test | C-2-14 | 7.3550680 | 5 |
| 61 | C-2 | Base | C-2-8 | 4.9287392 | 1 |
| 62 | C-2 | Base | C-2-8 | 4.9711866 | 2 |
| 63 | C-2 | Base | C-2-8 | 4.9157980 | 3 |
| 64 | C-2 | Base | C-2-8 | 4.6959248 | 4 |
| 65 | C-2 | Base | C-2-8 | 4.8736911 | 5 |
| 66 | C-2 | Base | C-2-9 | 7.0032191 | 1 |
| 67 | C-2 | Base | C-2-9 | 7.5373956 | 2 |
| 68 | C-2 | Base | C-2-9 | 7.1294804 | 3 |
| 69 | C-2 | Base | C-2-9 | 6.7478098 | 4 |
| 70 | C-2 | Base | C-2-9 | 6.6868443 | 5 |
| 71 | C-3 | Base | C-3-15 | 6.7721790 | 1 |
| 72 | C-3 | Base | C-3-15 | 6.8015114 | 2 |
| 73 | C-3 | Base | C-3-15 | 7.2292090 | 3 |
| 74 | C-3 | Base | C-3-15 | 7.0818477 | 4 |
| 75 | C-3 | Base | C-3-15 | 6.0113585 | 5 |

TABLE 1-continued

Sample Data Set

| Count | Lot | Split | Wafer | Voltage | Site |
|---|---|---|---|---|---|
| 76 | C-3 | Base | C-3-16 | 7.7052326 | 1 |
| 77 | C-3 | Base | C-3-16 | 8.2995669 | 2 |
| 78 | C-3 | Base | C-3-16 | 8.0005007 | 3 |
| 79 | C-3 | Base | C-3-16 | 7.6180855 | 4 |
| 80 | C-3 | Base | C-3-16 | 7.9564011 | 5 |
| 81 | C-3 | Base | C-3-17 | 6.8966618 | 1 |
| 82 | C-3 | Base | C-3-17 | 6.5769055 | 2 |
| 83 | C-3 | Base | C-3-17 | 6.7264488 | 3 |
| 84 | C-3 | Base | C-3-17 | 7.1209567 | 4 |
| 85 | C-3 | Base | C-3-17 | 7.4881033 | 5 |
| 86 | C-3 | Test | C-3-18 | 8.1243585 | 1 |
| 87 | C-3 | Test | C-3-18 | 7.3430776 | 2 |
| 88 | C-3 | Test | C-3-18 | 8.3381211 | 3 |
| 89 | C-3 | Test | C-3-18 | 7.8994055 | 4 |
| 90 | C-3 | Test | C-3-18 | 7.7990981 | 5 |
| 91 | C-3 | Test | C-3-19 | 8.4267763 | 1 |
| 92 | C-3 | Test | C-3-19 | 8.9354819 | 2 |
| 93 | C-3 | Test | C-3-19 | 8.8920017 | 3 |
| 94 | C-3 | Test | C-3-19 | 9.0911162 | 4 |
| 95 | C-3 | Test | C-3-19 | 9.2339916 | 5 |
| 96 | C-3 | Test | C-3-20 | 8.7479435 | 1 |
| 97 | C-3 | Test | C-3-20 | 9.6614885 | 2 |
| 98 | C-3 | Test | C-3-20 | 9.2768400 | 3 |
| 99 | C-3 | Test | C-3-20 | 9.3381161 | 4 |
| 100 | C-3 | Test | C-3-20 | 9.0338349 | 5 |
| 101 | C-3 | Test | C-3-21 | 8.3757754 | 1 |
| 102 | C-3 | Test | C-3-21 | 7.9134666 | 2 |

TABLE 1-continued

Sample Data Set

| Count | Lot | Split | Wafer | Voltage | Site |
|---|---|---|---|---|---|
| 103 | C-3 | Test | C-3-21 | 7.7438870 | 3 |
| 104 | C-3 | Test | C-3-21 | 8.7340078 | 4 |
| 105 | C-3 | Test | C-3-21 | 7.8299484 | 5 |

Table 2, below, sets forth a conventional, one-way ANOVA performed with respect to the data given in Table 1. Table 2 clearly indicates, in its bottom line, an equivalency score of 99.453%, which is a relatively high equivalency level and properly regarded as indicating equivalency. Unfortunately, this conclusion is in error.

TABLE 2

Means and Standard Deviations for One-Way ANOVA

| Means and Std Deviations Level | Number | Mean | Std Dev |
|---|---|---|---|
| Base | 55 | 5.13378 | 2.16140 |
| Test | 50 | 6.99178 | 1.93623 |
| Base LCL | −1.35042 | | |

TABLE 2-continued

Means and Standard Deviations for One-Way ANOVA

| Means and Std Deviations Level | Number | Mean | Std Dev |
|---|---|---|---|
| Base UCL | 11.61798 | | |
| Test Mean | 6.99178 | | |
| Test Stdev | 1.93623 | | |
| z lower | 4.308475749 | | |
| z upper | 2.389282265 | | |
| Prob lower | 8.21917E−06 | | |
| Prob upper | 0.008440663 | | |
| Prob both | 0.008448883 | | |
|  | 0.991551117 | | |
| Equivalency | 99.453% | | |

Figure 2:
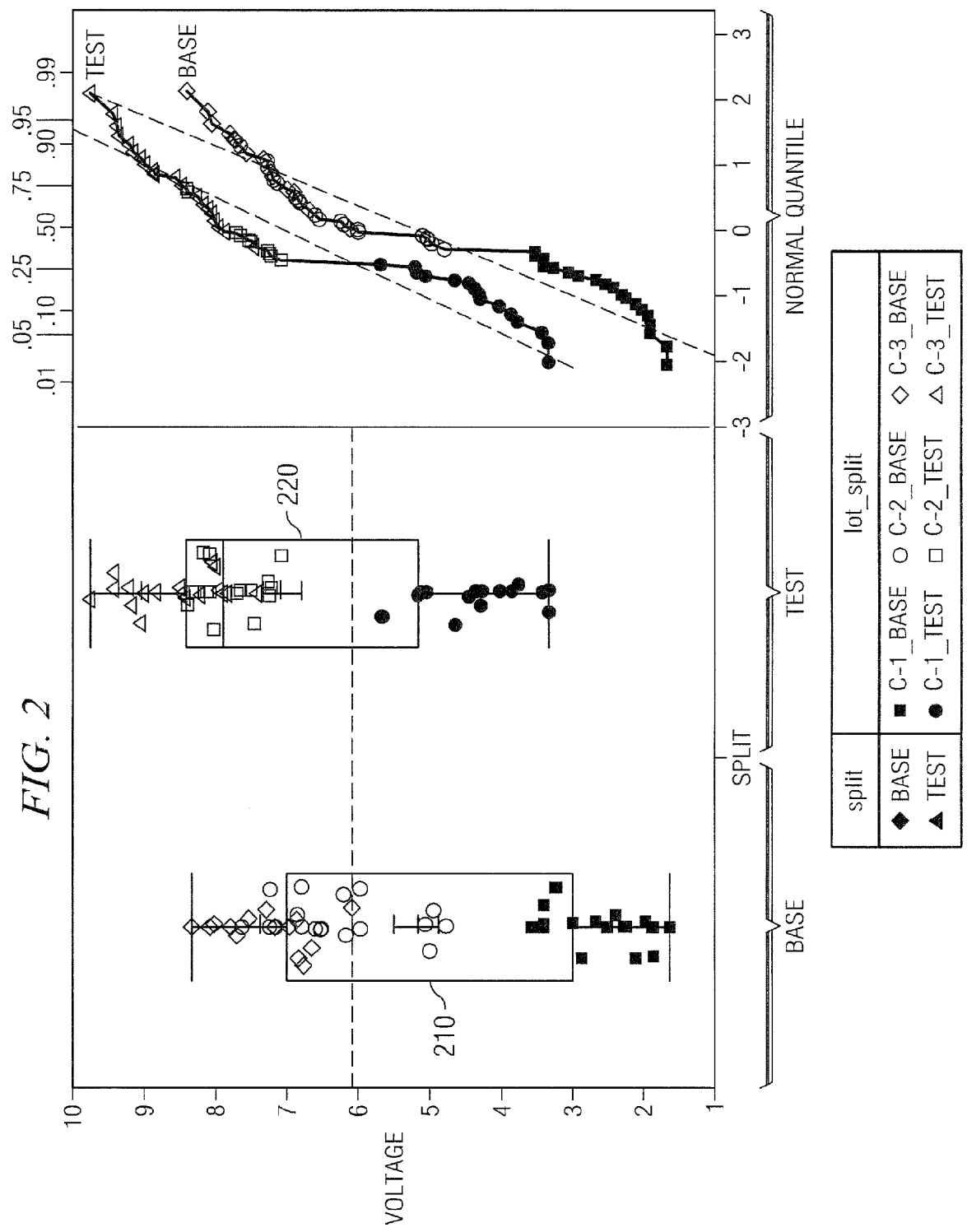
FIG. 2 illustrates a graphical representation of box plots of a one-way Analysis of Variance (ANOVA) of voltage response by split lot.

FIG. 2 illustrates a graphical representation of a one-way Analysis of Variance (ANOVA) of voltage response by split lot and particularly illustrates the shortcomings of one-way ANOVA. A base distribution 210 and a test distribution 220 substantially overlie one another, but contain substantial variances resulting from variations among lots. These variances give a false impression of equivalency.

Tables 3 and 4, below, give quantiles and means and standard deviations for the base and test distributions 210, 220.

TABLE 3

Quantiles of Base and Test Distributions

| Level | Minimum | 10% | 25% | Median | 75% | 90% | Maximum |
|---|---|---|---|---|---|---|---|
| Base | 1.623105 | 1.914144 | 2.990299 | 6.011358 | 7.003219 | 7.569672 | 8.299567 |
| Test | 3.288019 | 3.832029 | 5.059615 | 7.771493 | 8.347535 | 9.085388 | 9.661489 |

TABLE 4

Means and Standard Deviations of Base and Test Distributions

| Level | Number | Mean | Std Dev | Std Err Mean | Lower 95% | Upper 95% |
|---|---|---|---|---|---|---|
| Base | 55 | 5.13378 | 2.16140 | 0.29144 | 4.5495 | 5.7181 |
| Test | 50 | 6.99178 | 1.93623 | 0.27382 | 6.4415 | 7.5420 |

Figure 3:
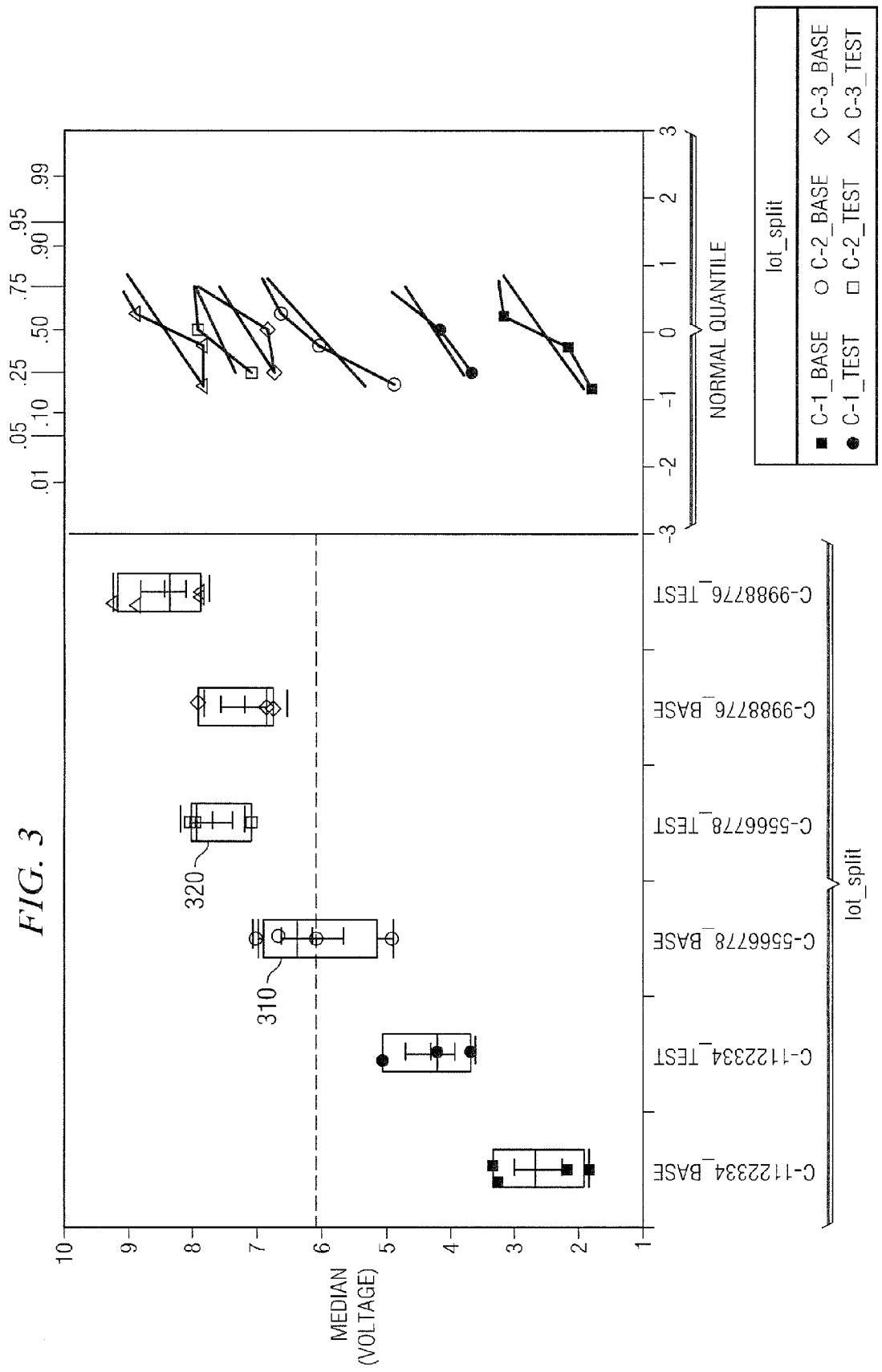
FIG. 3 illustrates a graphical representation of box plots of a one-way ANOVA of median voltage response by split lot.

FIG. 3 illustrates a graphical representation of a one-way ANOVA of median voltage response by split lot. Contrary to FIG. 2, base and test distributions separated by lot show far less equivalency. For example, a base distribution 310 for lot C-2 has little, if any, apparent overlap with a test distribution 320 for lot C-2, though it does appear to be statistically different.

Tables 5 and 6, below, give quantiles and means and standard deviations for the base and test distributions 210, 220.

TABLE 5

Quantiles of Base and Test Distributions

| Level | Minimum | 10% | 25% | Median | 75% | 90% | Maximum |
|---|---|---|---|---|---|---|---|
| C-1_Base | 1.83315 | 1.83315 | 1.919947 | 2.690417 | 3.302149 | 3.336033 | 3.336033 |
| C-1_Test | 3.711837 | 3.711837 | 3.711837 | 4.241418 | 5.08537 | 5.08537 | 5.085370 |
| C-2_Base | 4.915798 | 4.915798 | 5.203394 | 6.374448 | 6.923093 | 7.003219 | 7.003219 |
| C-2_Test | 7.140146 | 7.140146 | 7.140146 | 7.975419 | 8.031216 | 8.031216 | 8.031216 |
| C-3_Base | 6.801511 | 6.801511 | 6.801511 | 6.896662 | 7.956401 | 7.956401 | 7.956401 |
| C-3_Test | 7.899405 | 7.899405 | 7.902921 | 8.424474 | 9.1915 | 9.27684 | 9.276840 |

TABLE 6

Means and Standard Deviations of Base and Test Distributions

| Level | Number | Mean | Std Dev | Std Err Mean | Lower 95% | Upper 95% |
|---|---|---|---|---|---|---|
| C-1_Base | 4 | 2.63750 | 0.744063 | 0.37203 | 1.4535 | 3.8215 |
| C-1_Test | 3 | 4.34621 | 0.692737 | 0.39995 | 2.6254 | 6.0671 |
| C-2_Base | 4 | 6.16698 | 0.920307 | 0.46015 | 4.7026 | 7.6314 |
| C-2_Test | 3 | 7.71559 | 0.499133 | 0.28817 | 6.4757 | 8.9555 |
| C-3_Base | 3 | 7.21819 | 0.641076 | 0.37013 | 5.6257 | 8.8107 |
| C-3_Test | 4 | 8.50630 | 0.706565 | 0.35328 | 7.3820 | 9.6306 |

Figure 4:
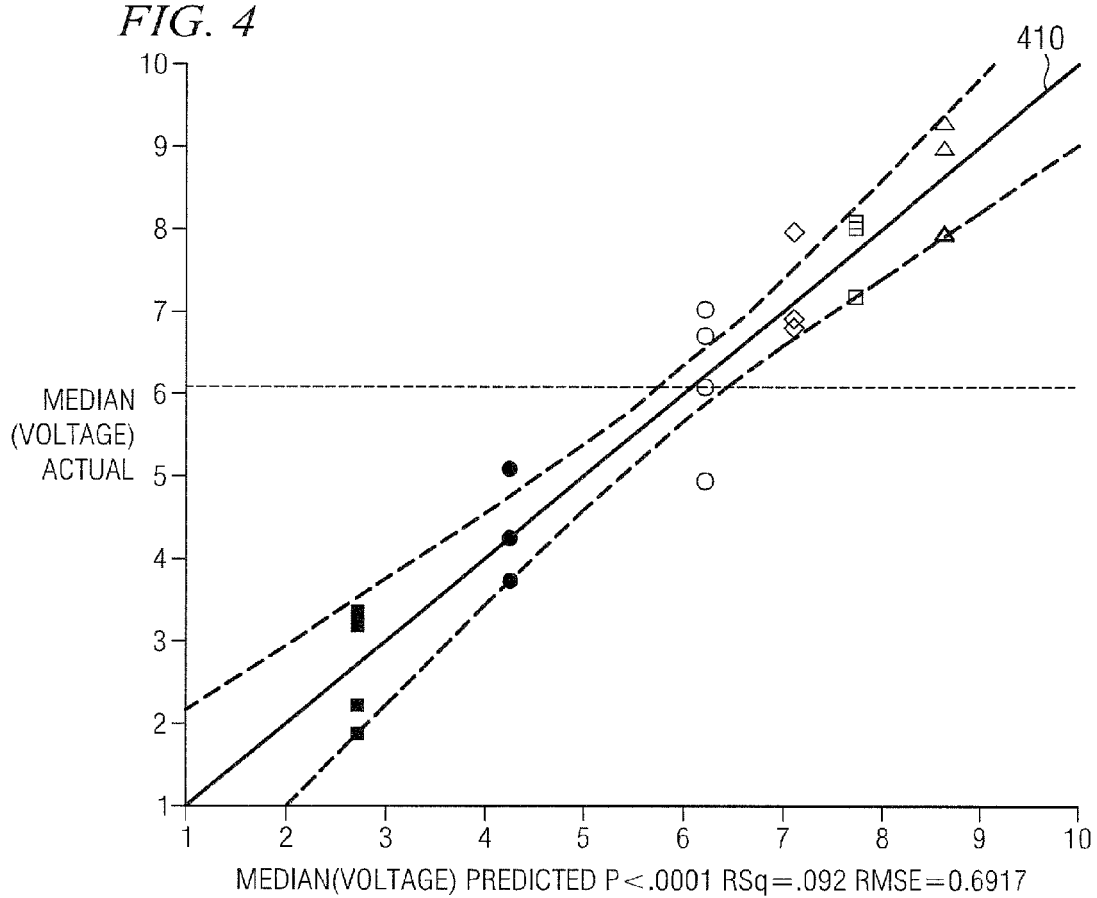
FIG. 4 illustrates a graphical representation of a two-way ANOVA of actual median voltage response per wafer compared to predicted median voltage response per wafer.

Now, a two-way ANOVA will be used to analyze the data of Table 1. FIG. 4 illustrates a graphical representation of a two-way ANOVA of actual median voltage response compared to predicted median voltage response. Actual and predicted mean voltages are given in a curve of best fit 410.

Tables 7 through 13, below, set forth results from the two-way ANOVA. The last row of the rightmost column of Table 11 contains the number of greatest interest. The p-value of 1.17322346e-4 corresponds to a statistical significance of 99.9983%. In other words, a difference exists with 99.9983% certainty between the base and test distributions in the split lot, which is properly deemed inadequate for equivalency to exist. Recall that the above-described conventional method of determining equivalency predicted an erroneously high 99.452% overlap.

TABLE 7

Summary of Fit

| | |
|---|---|
| RSquare | 0.918557 |
| RSquare Adj | 0.904185 |
| Root Mean Square Error | 0.691715 |
| Mean of Response | 6.051576 |
| Observations (or Sum Wgts) | 21 |

TABLE 8

Two-Way ANOVA

| Source | DF | Sum of Squares | Mean Square | F Ratio |
|---|---|---|---|---|
| Model | 3 | 91.739631 | 30.5799 | 63.9118 |
| Error | 17 | 8.133990 | 0.4785 | Prob > F |
| C. Total | 20 | 99.873622 | | <.0001 |

TABLE 9

Lack Of Fit

| Source | DF | Sum of Squares | Mean Square | F Ratio |
|---|---|---|---|---|
| Lack Of Fit | 2 | 0.1545114 | 0.077256 | 0.1452 |
| Pure Error | 15 | 7.9794787 | 0.531965 | Prob > F |
| Total Error | 17 | 8.1339901 | | 0.8660 |
| | | | | Max RSq |
| | | | Equivalency | 0.9201 |

TABLE 10

Parameter Estimates

| Term | Estimate | Std Error | t Ratio | Prob>|t| |
|---|---|---|---|---|
| Intercept | 6.0876513 | 0.151119 | 40.28 | <.0001 |
| lot[C-1] | -2.609621 | 0.213962 | -12.20 | <.0001 |
| lot[C-2] | 0.851244 | 0.213962 | 3.98 | 0.0010 |
| split[Base] | -0.757571 | 0.152509 | -4.97 | 0.0001 |

TABLE 11

Effect Tests

| Source | Nparm | DF | Sum of Squares | F Ratio | Prob > F |
|---|---|---|---|---|---|
| lot | 2 | 2 | 73.796115 | 77.1168 | 2.97379550e-9 |
| split | 1 | 1 | 11.806231 | 24.6750 | 1.17322346e-4 |

TABLE 12

Lot Least Squares Means

| Level | Least Sq Mean | Std Error | Mean |
|---|---|---|---|
| C-1 | 3.4780305 | 0.26235002 | 3.36981 |
| C-2 | 6.9388953 | 0.26235002 | 6.83067 |
| C-3 | 7.8460282 | 0.26235002 | 7.95425 |

TABLE 13

| Split Least Squares Means | | | |
| --- | --- | --- | --- |
| Level | Least Sq Mean | Std Error | Mean |
| Base | 5.3300802 | 0.20947756 | 5.17023 |
| Test | 6.8452224 | 0.21979792 | 7.02106 |

Figure 5:
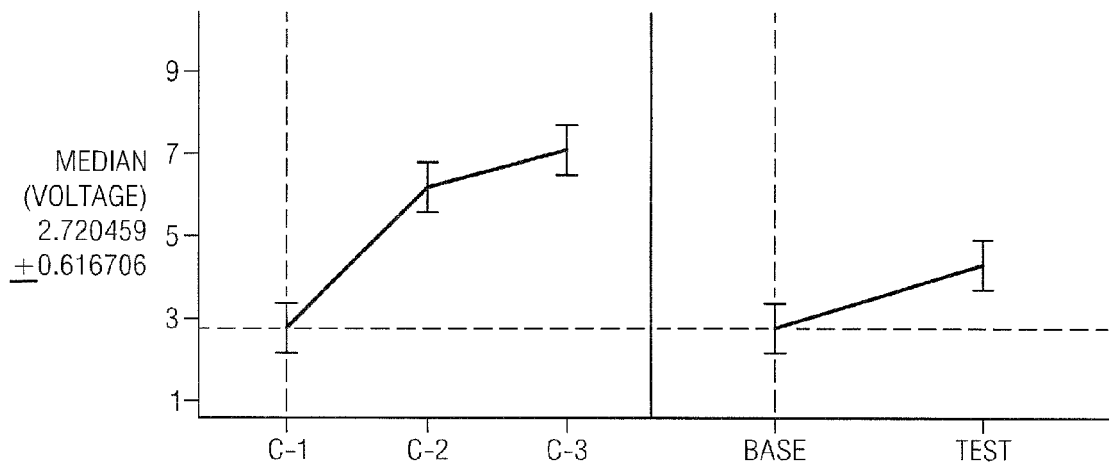
FIG. 5 illustrates a graphical representation of a prediction profiler.

FIG. 5 illustrates a graphical representation of a prediction profiler. Those skilled in the pertinent art are familiar with a prediction profiler, which is a known visualization feature of JMP®. In the context of the present example, the prediction profiler illustrates lot and split effects so their effect on equivalency may be evaluated.

Although the invention has been described in detail, those skilled in the pertinent art should understand that they can make various changes, substitutions and alterations herein without departing from the spirit and scope of the invention in its broadest form.

What is claimed is:

1. A method of establishing equivalency in the fabrication of a split lot of wafers of integrated circuits fabricated with and without a change in fabrication process, comprising:
   fabricating wafers of integrated circuits with and without the change;
   splitting the fabricated wafers into a split lot of control wafers fabricated without the change and experimental wafers fabricated with the change;
   measuring one or more characteristics of the integrated circuits in the split lot of wafers;
   dividing a set of data regarding said split lot measured one or more characteristics into control and experimental subsets;
   summarizing statistics regarding said set and said subsets to an experimental unit above a site level;
   performing a two-way analysis of variance with respect to said statistics to determine said equivalency, using said set for one way of said analysis of variance and said subsets for another way of said analysis of variance; and
   upon determining said equivalency, adopting the change into the fabrication process and fabricating further wafers of integrated circuits using the changed fabrication process.

2. The method as recited in claim 1, wherein said experimental unit is a wafer level.

3. The method as recited in claim 1, wherein said summarizing comprises determining a mean of said experimental units.

4. The method as recited in claim 1, wherein said summarizing comprises determining standard deviations within each of said experimental units.

5. A method of manufacturing an integrated circuit, comprising:
   analyzing equivalency with respect to a split lot of wafers of integrated circuits fabricated with and without a change in fabrication process by:
      fabricating wafers of integrated circuits with and without the change;
      splitting the fabricated wafers into a split lot of control units and experimental units;
      measuring at least one characteristic of the integrated circuits in said control units and experimental units;
      dividing a set of data regarding said split lot measured one or more characteristics into control and experimental subsets, summarizing statistics regarding said set and said subsets to an experimental unit above a site level, and
      performing a two-way analysis of variance with respect to said statistics to determine said equivalency, using said set for one way of said analysis of variance and said subsets for another way of said analysis of variance;
   evaluating a candidate integrated circuit fabrication process based on an existence of said equivalency; and
   if the evaluating determines that the candidate integrated circuit fabrication process is equivalent to an existing integrated circuit process, adopting said candidate integrated circuit fabrication process for fabricating additional wafers with the change.

6. The method as recited in claim 4, wherein said experimental unit is a wafer level.

7. The method as recited in claim 4, wherein said summarizing comprises determining a mean of said experimental units.

8. The method as recited in claim 4, wherein said summarizing comprises determining standard deviations within each of said experimental units.

9. The method as recited in claim 4, wherein said candidate integrated circuit fabrication process contains a change relative to a normative integrated circuit fabrication process, said change being selected from the group consisting of:
   a new supplier of a gas used to fabricate said integrated circuits,
   a modified process temperature,
   a modified process pressure,
   a modified process time,
   an equipment repair,
   an equipment modification,
   an equipment replacement,
   an equipment addition,
   an additional process step, and
   an omitted process step.

10. A method of establishing equivalency in the fabrication of a limited release lot of wafers of integrated circuits, comprising:
   fabricating a lot of wafers of integrated circuits by a normative integrated circuit fabrication process;
   designating a set of data regarding one or more characteristics of said lot fabricated by said normative integrated circuit fabrication process as a control set;
   fabricating said limited release lot of wafers of integrated circuits;
   designating a set of data regarding one or more characteristics of said limited release lot as an experimental set;
   summarizing statistics regarding said control and experimental sets to an experimental unit above a site level;
   performing a Kruskal-Wallace test with respect to said statistics to determine said equivalency; and
   upon determining said equivalency, effecting the distribution of said fabricated wafers of the said limited release lot as equivalent to wafers fabricated by the normative process.

11. The method as recited in claim 10, wherein said experimental unit is a lot level.

12. The method as recited in claim 10, wherein said summarizing comprises determining a lot mean of said limited release lot.

13. The method as recited in claim 10, wherein said summarizing comprises determining a lot standard deviation among means of said experimental units.

14. The method as recited in claim 10, wherein said summarizing comprises determining a lot mean of within-experimental-unit standard deviations.

15. A method of manufacturing an integrated circuit, comprising:
analyzing equivalency with respect to a limited release lot of wafers of integrated circuits by:
designating a set of data regarding a lot fabricated by a normative integrated circuit fabrication process as a control set,
designating a set of data regarding said limited release lot as an experimental set,
summarizing statistics regarding said control and experimental sets to an experimental unit above a site level, and
performing a Kruskal-Wallace test with respect to said statistics to determine said equivalency;
evaluating a candidate integrated circuit fabrication process based on an existence of said equivalency; and
if the evaluating determines that the candidate integrated circuit fabrication process is equivalent to an existing integrated circuit process, effecting the distribution of said fabricated wafers of the said limited release lot as equivalent to wafers fabricated by the normative process.

16. The method as recited in claim 15, wherein said experimental unit is a lot level.

17. The method as recited in claim 15, wherein said summarizing comprises determining a lot mean of said limited release lot.

18. The method as recited in claim 15, wherein said summarizing comprises determining a lot standard deviation among means of said experimental units.

19. The method as recited in claim 15, wherein said summarizing comprises determining a lot mean of within-experimental-unit standard deviations.

20. The method as recited in claim 15, wherein said candidate integrated circuit fabrication process contains a change relative to said normative integrated circuit fabrication process, said change being selected from the group consisting of:
a new supplier of a gas used to fabricate said integrated circuits,
a modified process temperature,
a modified process pressure,
a modified process time,
an equipment repair,
an equipment modification,
an equipment replacement,
an equipment addition,
an additional process step, and
an omitted process step.

* * * * *